United States Patent [19]

Runion

[11] Patent Number: 4,732,111
[45] Date of Patent: Mar. 22, 1988

[54] DISPOSABLE LITTER BOX

[76] Inventor: William J. Runion, 202 Crews St., Winston-Salem, N.C. 27101

[21] Appl. No.: 2,613

[22] Filed: Jan. 12, 1987

[51] Int. Cl.⁴ .............................................. A01K 29/00
[52] U.S. Cl. ........................................ 119/1; 220/403
[58] Field of Search ...................... 119/1, 19; 220/403, 220/404, 405, 406, 407; 206/216

[56] References Cited

U.S. PATENT DOCUMENTS

| 3,626,900 | 12/1971 | Failla | 119/1 |
| 3,793,989 | 2/1974 | Clark | 119/1 |
| 3,890,930 | 6/1975 | Clark | 119/1 |
| 3,890,931 | 6/1975 | Saver | 119/1 |
| 4,030,448 | 6/1977 | Nuttall | 119/1 |
| 4,171,680 | 10/1979 | Silver et al. | 119/1 |
| 4,553,671 | 11/1985 | Cheesman | 119/1 |
| 4,627,382 | 12/1986 | Muzzey | 119/1 |

FOREIGN PATENT DOCUMENTS 2556560  6/1985  France .................................... 119/1

Primary Examiner—John J. Wilson

[57] ABSTRACT

A disposable litter box for pets is presented having a folded plastic sleeve which extends to enclose the litter box for sealing and sanitary purposes after use. The box can be placed within a permanent housing and upon withdrawal of the box from the housing the sleeve automatically extends to enclose the box. A handle is attached to the end of the sleeve which can be folded to seal the box within the sleeve.

14 Claims, 6 Drawing Figures

DISPOSABLE LITTER BOX

BACKGROUND OF THE INVENTION

1. Field of the Invention

This invention relates to a disposable litter box for animals such as cats or dogs and includes a tray formed from cardboard with an attached plastic sleeve for covering the tray for disposal purposes.

2. Description of the Prior Art and Objectives of the Invention

Owners of small household pets such as cats are constantly faced with the problem of litter disposal. It is usual to have a pan or tray formed from metal or plastic into which sand or other granular litter materials are placed for use by the pet. Goldman et al in U.S. Pat. No. 3,227,137 demonstrates a sanitary container liner within a conventional litter box. When used, the liner can be closed and conveniently discarded. U.S. Pat. No. 4,305,544 demonstrates the use of a cardboard litter box and U.S. Pat. No. 4,164,314 shows a litter package having an adjustable opening. U.S. Pat. No. 3,908,597 teaches a self-straining litter box having two (2) compartments for alternate use. While others have developed various techniques and devices to improve the convenience of litter disposal by pet owners, various problems such as sanitation, spillage and high costs have remained.

With the present disadvantages known and problems associated therewith enduring, the present invention was conceived and it is one objective to provide a litter box which is relatively inexpensive to manufacture, and which is easy to put into use and to dispose by the pet owner.

It is another objective of the present invention to provide a disposable litter box which includes top sections which can be easily removed to expose the sand or other litter granules contained therein.

It is still another objective of the present invention to provide a litter box housing into which the disposable litter box can be inserted and secured therein.

It is yet another objective of the present invention to provide a litter box having a tray and an extendable sleeve whereby, upon removal of the litter box from the housing the sleeve extends to enclose the tray for sanitary purposes.

It is still yet another objective of the present invention to provide fastening means on the sleeve handle for securing the litter box in the housing during use, and after use for maintaining the handle in a folded position as the sleeve encloses the litter tray.

Other objectives and advantages of the present invention become apparent to those skilled in the art as a more detailed explanation of the invention is presented below.

SUMMARY OF THE INVENTION

The present invention includes a disposable litter box which is formed from cardboard and includes a tray and an enlarged end having a compartment for storage of a flexible sleeve. Upon opening the litter box by removing the top sections, litter granules contained therein are exposed. Once the top is removed the litter box can be inserted into a housing for use by a pet. Fastening means are provided on the outside of the sleeve handle positioned within the enlarged end. The sleeve handle fastening means engage fastening means on the outer surface of the housing when the litter box is inserted into the housing. Upon removal of the litter box the engaged fastening means cause the sleeve which is affixed to the sleeve handle to extend and cover the litter box and, when the sleeve is fully extended, upon continued urging the fastening means disengage. The sleeve handle can then be folded upon itself whereupon fastening means which are complementary engage thereby sealing the sleeve with the tray therein for sanitary purposes.

DESCRIPTION OF THE PREFERRED EMBODIMENT

Figure 1:
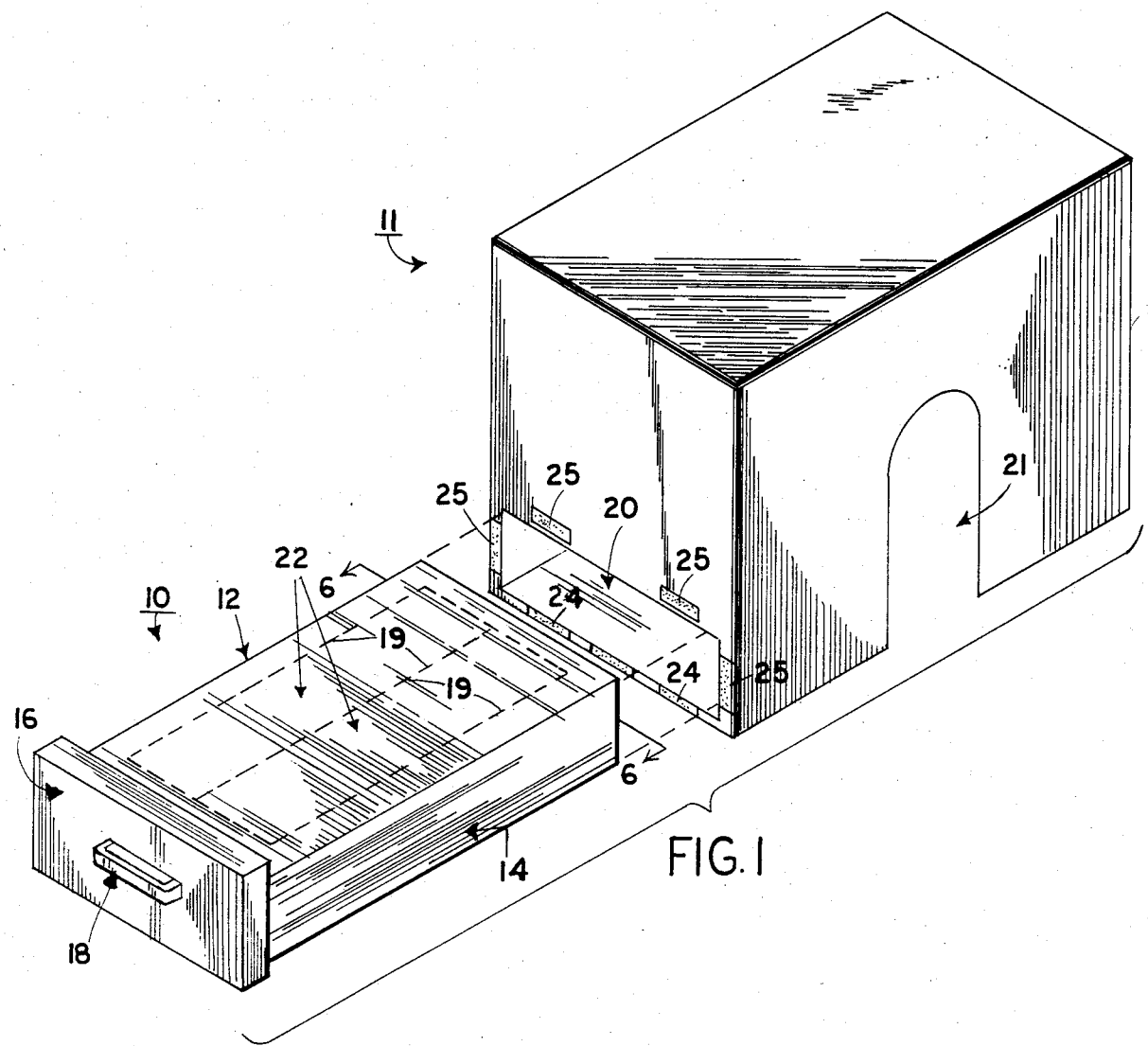
FIG. 1 demonstrates the disposable litter box of the invention with the top intact prior to removal of the top sections and insertion of the box into the housing.

The preferred form of the invention is shown in FIG. 1 in which a disposable litter box is insertable into a permanent housing. The disposable litter box is formed of suitable, inexpensive cardboard whereas the housing is regarded as permanent and is formed from metal or plastic and can be adequately sized and decorated as desired. The litter box has removable top sections outlined by perforations which, upon removal of the sections sand or other litter granules therein are exposed. As would be understood, the top sections are removed leaving a lip or rim therearound and the box is then inserted into a side opening of the housing whereupon fastening means attached to the litter box (sleeve handle) contact fastening means positioned around the side opening of the housing to secure the litter box within the housing. A thin plastic sleeve formed from 2 mil clear polyethylene is stored behind the sleeve handle within the enlarged end of the litter box and upon removal of the box from the housing the sleeve extends automatically to cover the box and enclose it, thus preventing sanitation problems from the contained animal feces. The foldable handle attached to the end of the sleeve can be folded on itself, thereby allowing complementary fastening means thereon to engage once the sleeve is extended and thus seal the sleeve around the box to further improve the sanitation and reduce any noxious odors therefrom. The litter box is formed from cardboard and the inside of the box is treated with a resinous material to prevent fluid leakage while in place within the housing. Hook and loop fasteners such as sold under the Velcro trademark provide the necessary holding power and such fastening means are used on the sleeve handle and around the side opening of the housing.

DETAILED DESCRIPTION OF THE DRAWINGS AND OPERATION OF THE INVENTION

Figure 6:
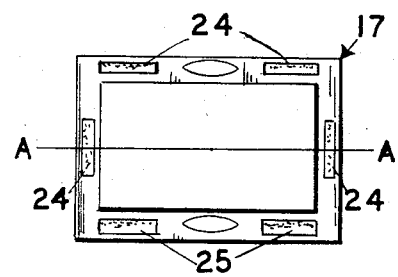
FIG. 6 demonstrates an end view of the litter box along lines 6—6 of FIG. 1.
Figure 2:
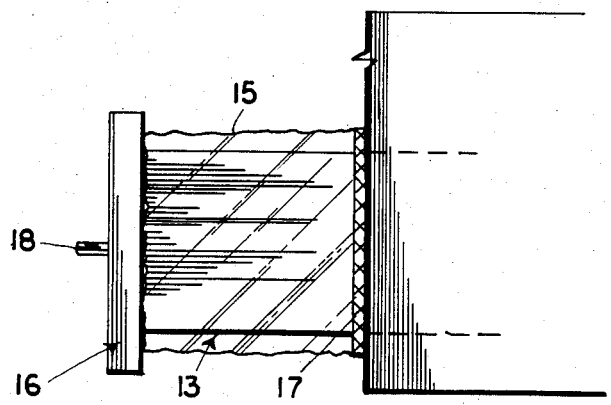
FIG. 2 illustrates a side view of the litter box partially withdrawn from the housing and illustrating the extension of the flexible sleeve.
Figure 3:
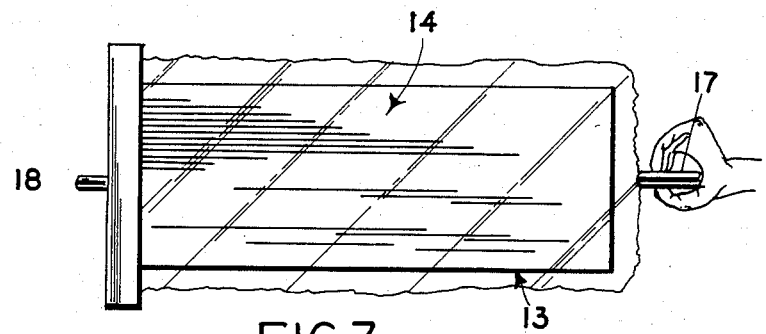
FIG. 3 demonstrates the used litter box fully removed from the housing with the flexible sleeve in its extended posture.
Figure 4:
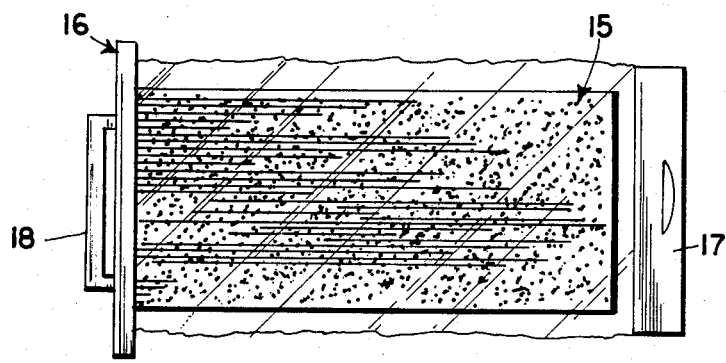
FIG. 4 demonstrates a top view of the litter box as shown in FIG. 3.
Figure 5:
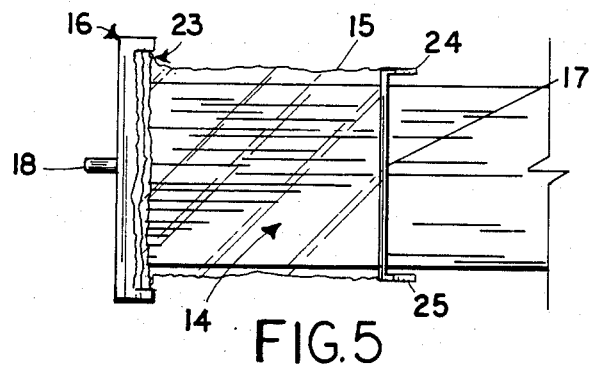
FIG. 5 shows a cross-sectional side elevational view of the litter box with the sleeve partially extended.

Turning now to the drawings, FIG. 1 demonstrates disposable litter box 10 removed from litter box housing 11. Litter box 10 is shown in FIG. 1 with removable top sections 22 intact within perforations 19. Litter box 10 is formed from carboard or other suitable materials and is coated along the inside of tray 12 with a conventional resinous material such as a wax to insure that no leakage occurs during and after urination by cats or other pets. As further shown in FIG. 1, disposable litter box 10 consists of tray 12 which contains litter granules such as sand and which is attached to an enlarged end 16. As seen in FIG. 5, end 16 includes a compartment 23 for storage of a thin transparent plastic cover or sleeve 15. Box handle 18 provides a convenient means for carrying litter box 10 prior to opening and use. Sleeve handle 17 which includes a series of hook and loop fasteners 24 and 25 therearound as demonstrated in FIG. 6 allows sleeve handle 17 to be maintained in a closed position as shown in FIG. 3 after extension of sleeve 15. As would be understood, fasteners 24 and 25 are complementary and upon folding handle 17 along lines A—A as shown in FIG. 6, fastening means 24 and 25 engage and maintain handle 17 folded to contain odors within tray 12.

As further illustrated in FIG. 1, housing 11 which may be formed from plastic, wood, metal or other suitable permanent materials defines a tray opening 20 for entry of litter box 10 and upon insertion, complementary fastening means 24, 25 (FIG. 1) engage their counterparts on handle 17 (positioned within compartment 23) to secure litter box 10 within housing 11 and to prevent box 10 from becoming dislodged by the activities of a pet as it enters or exits through housing entrance 21.

Sleeve 15 is folded in accordion fashion within compartment 23 as seen in FIG. 5 and is easily withdrawn or extended, after litter box 10 is properly inserted in housing 11, by urging litter box 10 out of housing 11 by pulling handle 18. Once sleeve 15 is fully extended, a final tug or urge on handle 18 will disengage complementary fastening means 24 and 25 on housing 11 and sleeve handle 17 to free box 10 from housing 11. Sleeve handle 17 can then be folded along lines A—A (FIG. 6) and with sleeve handle 17 positioned as shown in FIG. 3, litter box 10 can then be discarded into a waste receptacle or otherwise for disposal purposes. By thus sealing sleeve 15 over tray 12 which includes tray bottom 13 and tray sides 14, noxious, pungent odors from animal feces is contained substantially within sleeve 15 and an improvement in convenience and sanitation is provided. Upon disposal of litter box 10, a fresh litter box can then be opened and inserted for use. It is anticipated that litter box 10 will be commercialized having litter granules contained therein although supplying the litter granules to the disposable box may be left to the individual pet owner.

Various changes and modifications can be made to the present invention by those skilled in the art and the illustrations and examples herein are merely for explanatory purposes and not intended to limit the scope of the appended claims.

I claim:

1. A litter box comprising a tray, said tray forming a storage compartment along one end, a flexible cover member, said cover member attached to said tray, said cover member positionable from within said compartment to an extended position whereby said cover member in the extended position covers said tray.

2. A litter box as claimed in claim 1 wherein said tray includes a bottom and sides, said sides joined to said bottom.

3. A litter box as claimed in claim 1 and including an enlarged end, said end attached to said tray.

4. A litter box as claimed in claim 3 wherein said enlarged end forms said storage compartment around said tray.

5. A litter box as claimed in claim 3 wherein said cover member comprises a sleeve.

6. A litter box as claimed in claim 5 wherein said sleeve is attached to said enlarged end.

7. A litter box as claimed in claim 5 and including a sleeve handle, said sleeve handle attached to said sleeve.

8. A litter box as claimed in claim 7 wherein said sleeve handle includes fastening means.

9. A litter box as claimed in claim 1 and including a removable top, said top attached to said tray.

10. A litter box comprising: a tray, said tray having a bottom and side walls, said side walls attached to said bottom, a removable top, said top attached to said side walls, an enlarged end, said end attached to one of said side walls, said enlarged end forming a storage compartment, a flexible sleeve, one end of said sleeve attached to said enlarged end and the other end of said sleeve affixed to a foldable sleeve handle whereby said sleeve can be withdrawn from said storage compartment and extended to totally enclose said tray.

11. A litter box as claimed in claim 10 wherein said sleeve handle includes fastening means whereby said handle upon folding, is maintained in its foled position by said fastening means.

12. A litter box and housing in combination comprising:
    (a) a disposable tray, an enlarged end, said end attached to said tray, said end forming a storage compartment around said tray, a flexible sleeve, said sleeve attached to said enlarged end around said tray, a sleeve handle, and handle affixed to said sleeve, said handle having fastening means positioned thereon,
    (b) the housing defining a first opening for receiving said disposable tray and defining a second opening for entry by a pet, said first opening having housing fastening means attached proximate thereto on the outer surface of the housing, said housing fastening means being complementary to said handle fastening means for connection therewith.

13. A litter box as claimed in claim 12 wherein said housing is molded from plastic.

14. A litter box as claimed in claim 12 wherein said tray is formed from cardboard.

* * * * *